United States Patent
Mine et al.

(10) Patent No.: US 11,305,779 B2
(45) Date of Patent: Apr. 19, 2022

(54) BEHAVIOR PREDICTION DEVICE

(71) Applicant: HONDA MOTOR CO., LTD., Tokyo (JP)

(72) Inventors: Takashi Mine, Wako (JP); Takeru Goto, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 64 days.

(21) Appl. No.: 16/818,137

(22) Filed: Mar. 13, 2020

(65) Prior Publication Data
US 2020/0290629 A1 Sep. 17, 2020

(30) Foreign Application Priority Data

Mar. 14, 2019 (JP) .............................. JP2019-046662

(51) Int. Cl.
 *B60W 40/09* (2012.01)
 *B60W 40/04* (2006.01)
 *B60W 30/095* (2012.01)
(52) U.S. Cl.
 CPC ........ *B60W 40/09* (2013.01); *B60W 30/0953* (2013.01); *B60W 30/0956* (2013.01); *B60W 40/04* (2013.01)
(58) Field of Classification Search
 CPC ............. B60W 40/09; B60W 30/0953; B60W 30/0956; B60W 40/04
 See application file for complete search history.

(56) References Cited

U.S. PATENT DOCUMENTS

2018/0365990 A1* 12/2018 Suzuki .................. G08G 1/163
2020/0042799 A1* 2/2020 Huang ................ G06K 9/6262

FOREIGN PATENT DOCUMENTS

| CN | 108169507 A | * | 6/2018 | |
| JP | 2006168628 A | * | 6/2006 | |
| JP | 2007-233765 A | | 9/2007 | |
| JP | 2015094683 A | * | 5/2015 | |
| WO | WO-2016084645 A1 | * | 6/2016 | ............ B60W 30/10 |

OTHER PUBLICATIONS

Machine translation of WO-2016084645-A1 (Year: 2016).*
Machine translation of JP-2015094683-A (Year: 2015).*
Machine translation of CN-108169507-A (Year: 2018).*
Machine translation of JP-2006168628-A (Year: 2006).*

* cited by examiner

*Primary Examiner* — Jeff A Burke
*Assistant Examiner* — Mohamad O El Sayah
(74) *Attorney, Agent, or Firm* — Carrier Blackman & Associates, P.C.; Joseph P. Carrier; Jeffrey T. Gedeon

(57) ABSTRACT

A behavior prediction device predicts behavior of another vehicle traveling around a host vehicle, and the behavior prediction device includes: a reference position setting unit that sets a reference position (reference line) along a shape of a road; a position detection unit that detects a position of the other vehicle; a distance calculation unit that calculates a distance from the reference position (reference line) to the other vehicle on the basis of information about the reference position (reference line) and information about the position of the other vehicle; and a prediction unit that predicts a trajectory of the other vehicle on the basis of information about the distance in time series calculated by the distance calculation unit.

5 Claims, 9 Drawing Sheets

BEHAVIOR PREDICTION DEVICE

CROSS-REFERENCE TO RELATED APPLICATION

This application is based upon and claims the benefit of priority from Japanese Patent Application No. 2019-046662 filed on Mar. 14, 2019, the contents of which are incorporated herein by reference.

BACKGROUND OF THE INVENTION

Field of the Invention

The present invention relates to a behavior prediction device that predicts behavior of another vehicle traveling around a host vehicle.

Description of the Related Art

In recent years, an automated driving vehicle that autonomously travels has been developed. The automated driving vehicle (host vehicle) performs travel control (acceleration, deceleration, and steering) while recognizing a peripheral state. In this case, it is expected to precisely predict behavior of another vehicle traveling around the host vehicle. Japanese Laid-Open Patent Publication No. 2007-233765 discloses a device that predicts, on the basis of the positions of a plurality of movable bodies such as an automobile (other vehicles) and an internal state, a route (trajectory) of each movable body.

SUMMARY OF THE INVENTION

The behavior of the other vehicle after the present time can be predicted to some extent on the basis of the past behavior from a certain time point to the present time. For example, since the past trajectory of the other vehicle traveling in a straight road is a straight line along the road, it is predicted that the trajectory of the other vehicle after the present time is the straight line along the road. However, if a road shape (strait line, curve, and the like) changes, prediction accuracy by this method deteriorates.

The present invention has been made to solve the above problem, and an object is to provide a behavior prediction device that can precisely predict a trajectory of another vehicle after the present time.

An aspect of the present invention is a behavior prediction device configured to predict behavior of another vehicle traveling around a host vehicle, and the behavior prediction device includes: a reference position setting unit configured to set a reference position along a shape of a road; a position detection unit configured to detect a position of the other vehicle; a distance calculation unit configured to calculate a distance from the reference position to the other vehicle on a basis of information about the reference position and information about the position of the other vehicle; and a prediction unit configured to predict a trajectory of the other vehicle on a basis of information about the distances in time series calculated by the distance calculation unit.

According to the present invention, the trajectory can be predicted more accurately than in a case where the trajectory of the other vehicle is predicted by using only the positional information.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A preferred embodiment of a behavior prediction device according to the present invention is hereinafter described in detail with reference to the attached drawings.

In the embodiment to be described below, a behavior prediction device 82 (FIG. 1) that is used in a vehicle control device 10 (FIG. 1) of a host vehicle 90 (FIG. 3A) is assumed. The host vehicle 90 can switch the driving between manual driving in which travel control (vehicle control of acceleration, deceleration, and steering) is performed by a vehicle occupant, and automated driving in which at least a part of the travel control is automatically performed.

[1. Configuration of vehicle control device 10]

Figure 1:
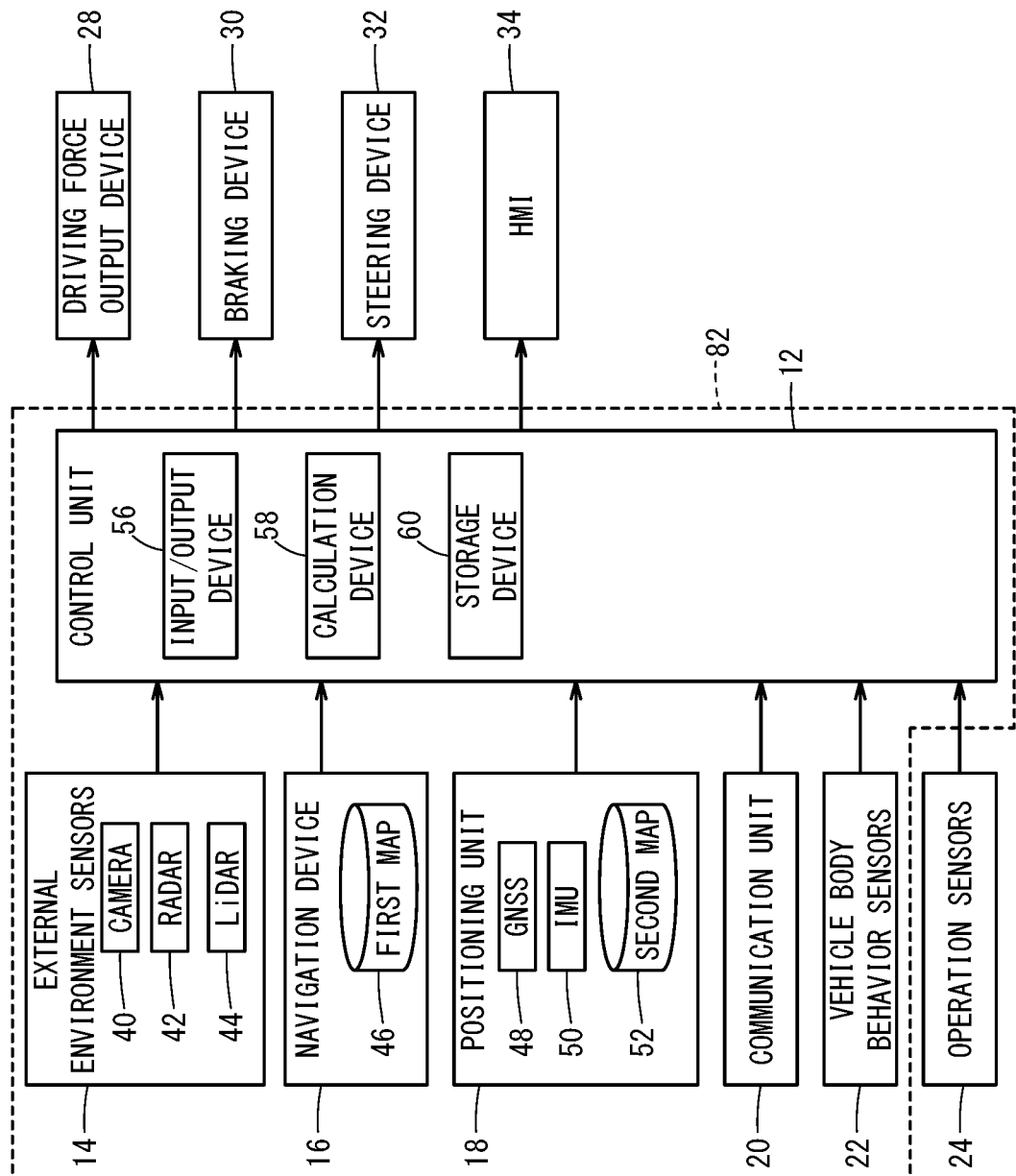
FIG. 1 is a block diagram of a behavior prediction device and a vehicle control device according to an embodiment.

A configuration of the vehicle control device 10 is described with reference to FIG. 1. The vehicle control device 10 includes a control unit 12, an input device group that inputs various pieces of information to the control unit 12, and an output device group that operates the host vehicle 90 on the basis of the various pieces of information output from the control unit 12. The input device group includes external environment sensors 14, a navigation device 16, a positioning unit 18, a communication unit 20, vehicle body behavior sensors 22, and operation sensors 24. The output device group includes a driving force output device 28, a braking device 30, a steering device 32, and an HMI 34.

[1.1. Configuration of behavior prediction device 82]

In the configuration of the vehicle control device 10, the behavior prediction device 82 includes the external environment sensors 14, the navigation device 16, the positioning unit 18, the communication unit 20, the vehicle body behavior sensors 22, and the control unit 12.

[1.2. Configuration of input device group]

The external environment sensors 14 include one or more cameras 40, one or more radars 42, and one or more LiDARs 44. The camera 40 photographs a peripheral environment of the host vehicle 90, and outputs image information to the control unit 12. The radar 42 detects a target around the host vehicle 90, and outputs detected information to the control unit 12. The LiDAR 44 detects the target around the host vehicle 90 and a road 100, and outputs detected information to the control unit 12.

The navigation device 16 specifies the position of the host vehicle 90 by a GPS or the like, generates a travel route from the position of the host vehicle 90 to a destination designated by the vehicle occupant with reference to map information of a first map 46 stored in a memory such as a ROM, and outputs travel route information to the control unit 12.

The positioning unit 18 outputs to the control unit 12, positional information that expresses the position of the host vehicle 90 specified by a GNSS 48 and an IMU 50, and map information of a second map 52 stored in a memory (map storage unit) such as a ROM. Note that the second map 52 includes the map information that is more accurate and specific than that of the first map 46, and for example, includes information about the number of lanes, a lane position, lane width, or the like in the road 100 illustrated in FIG. 3A. Moreover, the map information of the second map 52 includes positional information of a reference line 104 (reference position) that is used when a trajectory of another vehicle 92 is predicted. The positional information of the reference line 104 includes positional information of a plurality of reference positions that align along a shape of the road 100. Alternatively, the positional information of the reference line 104 may be information about a virtual line that connects the reference positions that are adjacent to each other. As the reference line 104, for example, a central position of a travel lane 102a may be set, the position of a section line 106 of the road 100 may be set, or a position outside the road 100 may be set.

The communication unit 20 includes a communication device that receives information broadcasted by a broadcasting station, a communication device that receives information transmitted by a road-side machine that is disposed on the road 100, and a communication device that receives information transmitted by vehicles other than the host vehicle 90. The communication unit 20 outputs the received various pieces of information to the control unit 12.

The vehicle body behavior sensors 22 include various sensors that measure behavior of the host vehicle 90, for example, a vehicle speed sensor that detects travel speed of the host vehicle 90, a yaw rate sensor that detects a yaw rate of the host vehicle 90, or the like. The vehicle body behavior sensors 22 output detected various pieces of information to the control unit 12.

The operation sensors 24 include various switches and sensors that detect operation performed by the vehicle occupant. Examples of the switches and the sensors include an automated driving switch that changes the driving between the automated driving and the manual driving, a blinker switch that indicates a blinking direction of a blinker, an accelerator pedal sensor that detects an operation amount of an accelerator pedal, a brake pedal sensor that detects an operation amount of a brake pedal, a steering angle sensor that detects a steering angle of a steering wheel, and a contact sensor provided to the steering wheel. The operation sensors 24 outputs detected various pieces of information to the control unit 12.

[1.3. Configuration of control unit 12]

The control unit 12 is configured by an ECU. The control unit 12 includes an input/output device 56, a calculation device 58, and a storage device 60. The input/output device 56 includes an A/D conversion circuit, a communication interface, a driver, or the like. The calculation device 58 includes a processor including a CPU or the like, for example. The calculation device 58 executes programs stored in the storage device 60, so that various functions are achieved. The various functions of the calculation device 58 are described in [1.5.] below. The storage device 60 is a memory such as a RAM or a ROM. The storage device 60 stores various programs, numerical information that is used in a process performed by the calculation device 58, and the like.

[1.4. Configuration of output device group]

The driving force output device 28 includes a driving force output ECU and an actuator (including a traction motor, a throttle valve, or the like) to be controlled by the driving force output ECU. The driving force output device 28 adjusts driving force in accordance with the vehicle occupant's operation of the accelerator pedal or instruction information (driving instruction) that is output from the control unit 12.

The braking device 30 includes a braking ECU and an actuator (including brake actuator or the like) to be controlled by the braking ECU. The braking device 30 adjusts braking force in accordance with the vehicle occupant's operation of the brake pedal or instruction information (braking instruction) that is output from the control unit 12.

The steering device 32 includes an electric power steering (EPS) ECU and an actuator (including EPS actuator or the like) to be controlled by the EPS ECU. The steering device 32 adjusts a steering angle in accordance with the vehicle occupant's operation of the steering wheel or instruction information (steering instruction) that is output from the control unit 12.

The HMI 34 includes a display device and a speaker device. The display device and the speaker device output an image and an audio in accordance with instruction information (notification instruction) that is output from the control unit 12.

[1.5. Various functions of calculation device 58]

Figure 2:
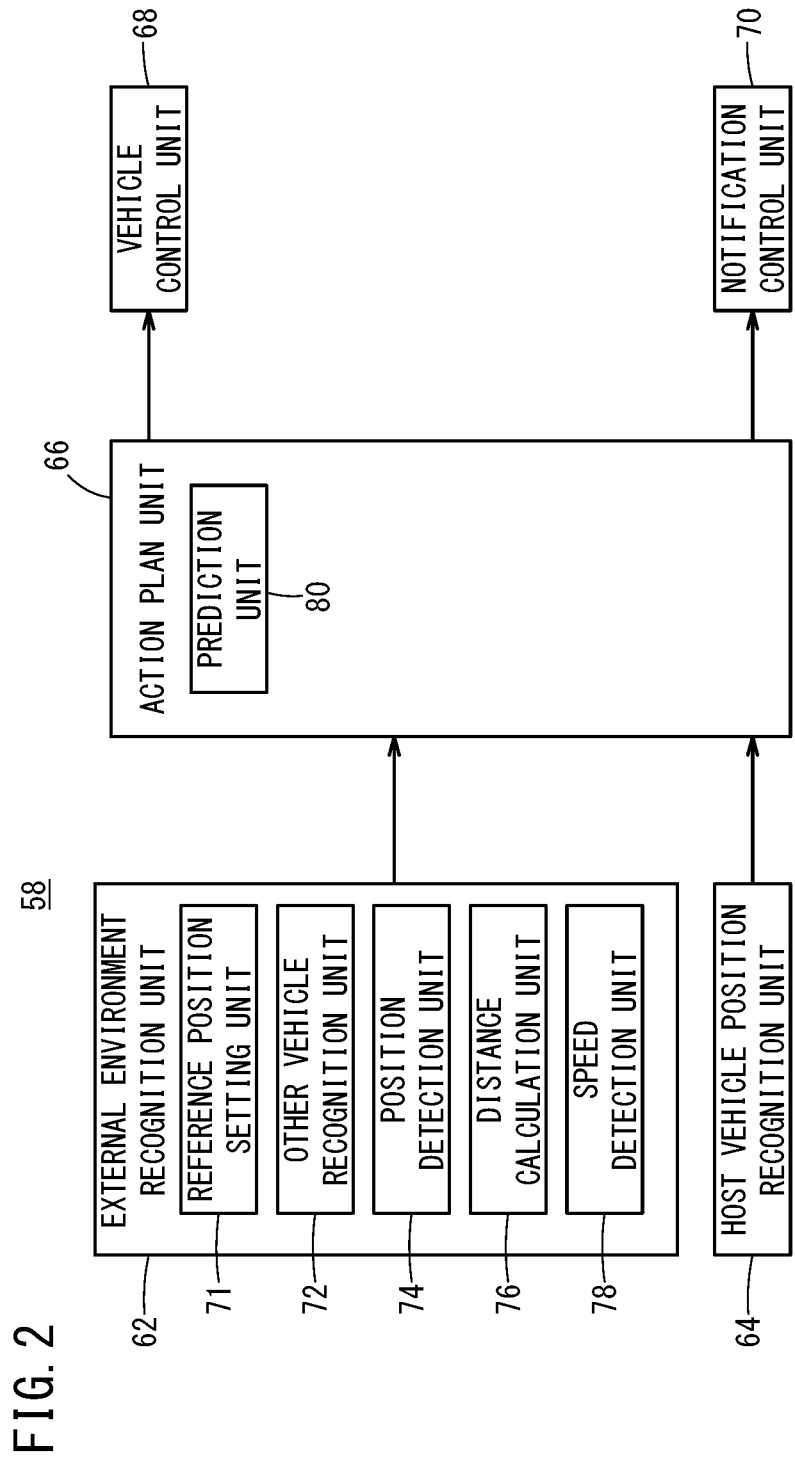
FIG. 2 is a function block diagram of a calculation device.

The various functions achieved by the calculation device 58 are described with reference to FIG. 2. The calculation device 58 functions as an external environment recognition unit 62, a host vehicle position recognition unit 64, an action plan unit 66, a vehicle control unit 68, and a notification control unit 70.

The external environment recognition unit 62 performs image processing using the image information output from the camera 40, and object recognition using the detected information from the radar 42 and the LiDAR 44 so as to recognize a state around the host vehicle 90. The external environment recognition unit 62 functions as a reference position setting unit 71, an other vehicle recognition unit 72, a position detection unit 74, a distance calculation unit 76, and a speed detection unit 78 of the behavior prediction device 82.

The host vehicle position recognition unit 64 recognizes the position of the host vehicle 90 on the basis of the positional information output from the navigation device 16 or the positioning unit 18, and the map information in at least one of the first map 46 and the second map 52.

The action plan unit 66 generates a local map (dynamic map) that includes static information and dynamic information around the host vehicle 90 on the basis of a recognition result from the external environment recognition unit 62 and a recognition result from the host vehicle position recognition unit 64. Then, the action plan unit 66 decides the optimum action on the basis of the local map and the state of the host vehicle 90 (travel speed, steering angle, and position), and calculates the travel speed (or acceleration/deceleration) to perform the action and generates a travel trajectory. In the present embodiment, the action plan unit 66 functions as a prediction unit 80 of the behavior prediction device 82.

The vehicle control unit 68 calculates the acceleration/deceleration in order to cause the host vehicle 90 to travel at the travel speed calculated by the action plan unit 66, and the steering angle in order to cause the host vehicle 90 to travel along the travel trajectory generated by the action plan unit 66. The vehicle control unit 68 outputs instruction information about the acceleration/deceleration and the steering angle to the driving force output device 28, the braking device 30, and the steering device 32 through the input/output device 56.

If the operation decided by the action plan unit 66 requires the notification, the notification control unit 70 outputs instruction information expressing notification contents to the HMI 34 through the input/output device 56.

[2. Process to be performed in behavior prediction device 82]

Figure 3A:
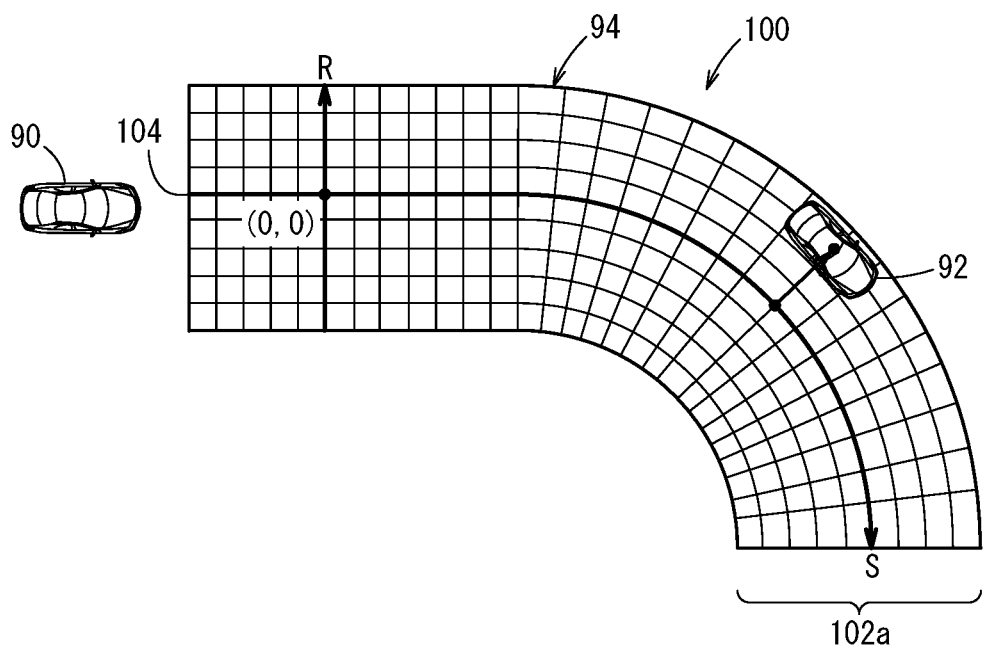
FIG. 3A and FIG. 3B are schematic diagrams expressing a coordinate plane in which a traveling direction and a width direction of a travel lane are axes.
Figure 3B:
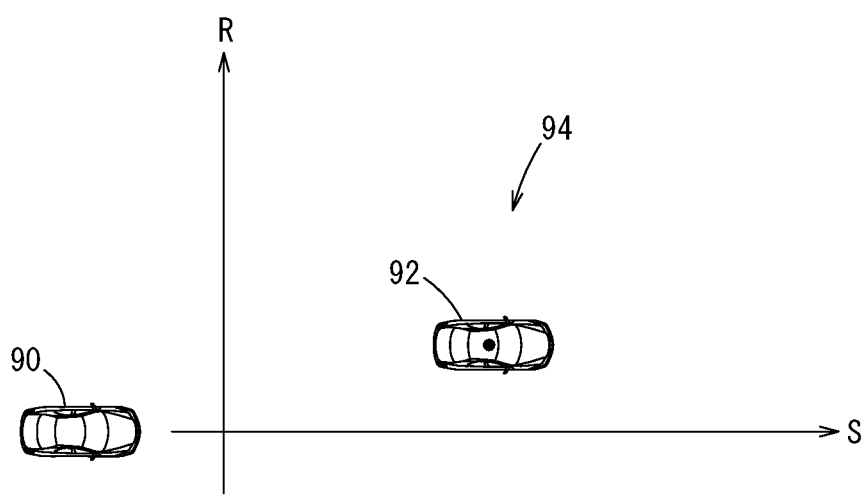

A summary of a behavior prediction process to be performed in the behavior prediction device 82 is described with reference to FIG. 3A and FIG. 3B. In the behavior prediction device 82, the road 100, that is, a two-dimensional coordinate plane 94 is assumed. An axis of the coordinate plane 94 is the reference line 104 that is set along the travel lane 102a where the other vehicle 92 corresponding to a subject of the trajectory prediction travels, and the coordinate plane 94 is parallel to a horizontal plane. In a first coordinate S of the coordinate plane 94, a traveling direction of the travel lane 102a is positive. In a second coordinate R of the coordinate plane 94, one direction in a width direction of the travel lane 102a (a direction that is rotated 90 degrees from the traveling direction, or a direction orthogonal to the traveling direction) is positive. Here, a direction from a right side to a left side of the travel lane 102a is positive. A predetermined position in the travel lane 102a that is recognized is set as the origin of the coordinate plane 94. Alternatively, an observation start position in the travel lane 102a may be set as the zero position of the first coordinate S, and a central position of the travel lane 102a may be set as the zero position of the second coordinate R. Moreover, as the origin of the coordinate plane 94, a position of the other vehicle 92 in the past (several seconds ago), that is, a start point of the trajectory where the other vehicle 92 has traveled may be set. As illustrated in FIG. 3B, if it is assumed that the reference line 104 is straight, the two axes (S axis, R axis) of the coordinate plane 94 are orthogonal to each other.

The behavior prediction device 82 predicts movement of the other vehicle 92 in the width direction (movement by a distance r from the reference line 104) after the present time by using the coordinate plane 94 on the basis of information about the distances r between the other vehicle 92 and the reference line 104 (value of second coordinate R) detected several times in the past (from several seconds ago to the present time). In addition, the behavior prediction device 82 predicts a speed v of the other vehicle 92 after the present time on the basis of information about the speed v of the other vehicle 92 detected several times in the past (from several seconds ago to the present time).

Figure 4:
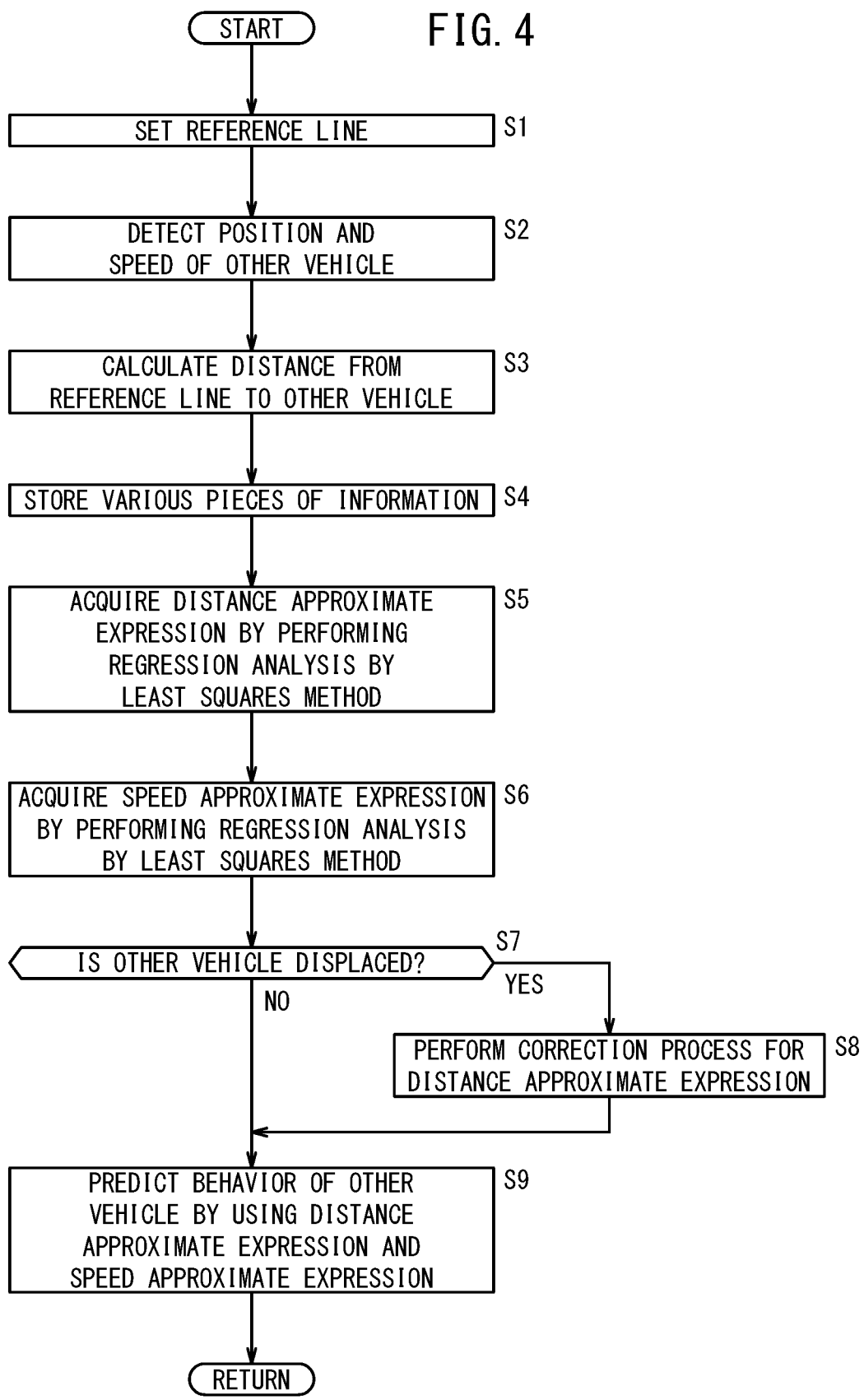
FIG. 4 is a flowchart expressing a behavior prediction process to be performed in the behavior prediction device.

The behavior prediction process that is performed by the behavior prediction device 82 is described with reference to FIG. 4. The behavior prediction process illustrated in FIG. 4 is performed at predetermined time intervals. Note that in the behavior prediction process, the other vehicle recognition unit 72 recognizes the other vehicle 92 on the basis of the information detected by the external environment sensors 14 (the image information and the distance information of the other vehicle 92) or the information transmitted from the other vehicle 92 by the communication unit 20.

In step S1, the reference position setting unit 71 sets the reference line 104 along the shape of the road 100. Here, the reference position setting unit 71 may set the reference line 104 that is stored as the map information of the second map 52. Alternatively, the reference position setting unit 71 may recognize the shape of the road 100 on the basis of the information from the external environment sensors 14, and set the reference line 104 along the shape thereof.

In step S2, the position detection unit 74 detects the position of the other vehicle 92 that is recognized by the other vehicle recognition unit 72. Here, the position detection unit 74 detects the position of the other vehicle 92 on the map by using at least one type of information, i.e., the information from the external environment sensors 14 or the map information of the second map 52. Moreover, the speed detection unit 78 detects the speed v of the other vehicle 92 that is recognized by the other vehicle recognition unit 72. Note that the position detection unit 74 and the speed detection unit 78 can also detect each piece of the information on the basis of the information that is transmitted from the other vehicle 92 by the communication unit 20. After step S2, the process advances to step S3.

In step S3, the distance calculation unit 76 calculates the distance r from the reference line 104 set in step S1 to the other vehicle 92. After step S3, the process advances to step S4.

Figure 5:
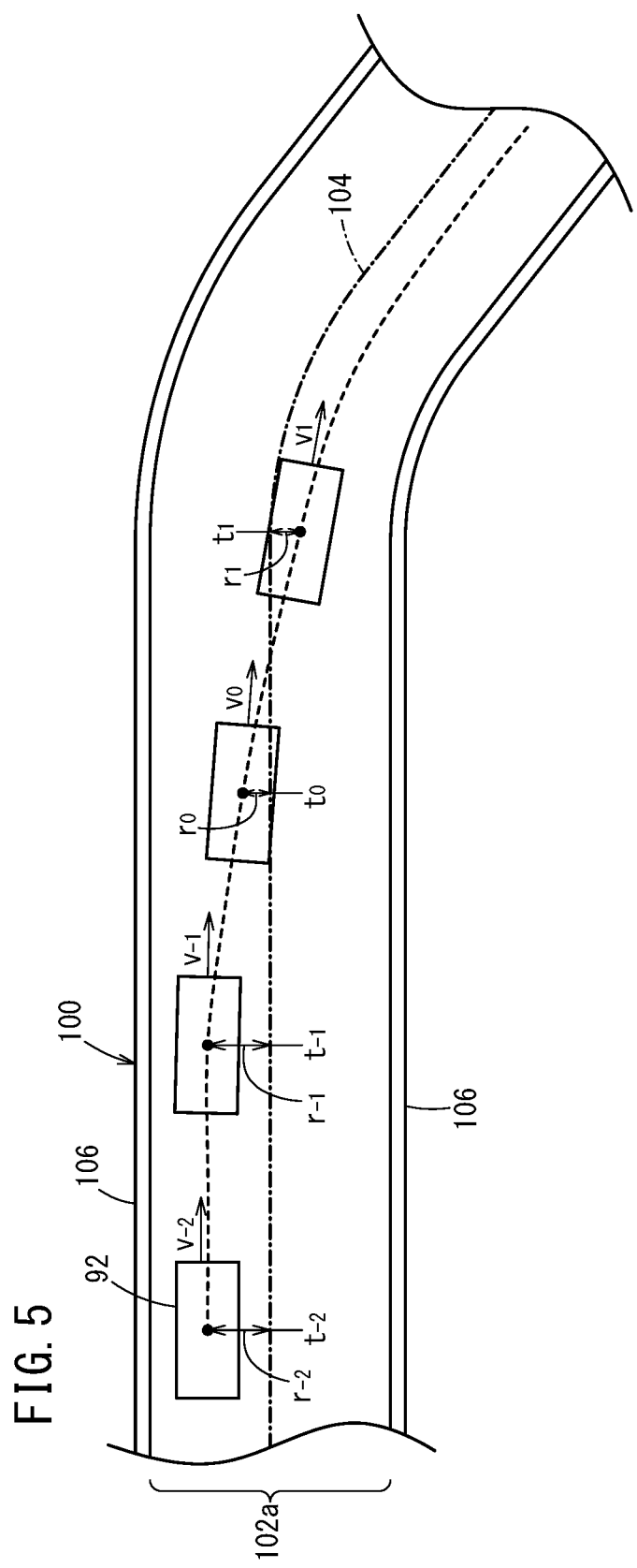
FIG. 5 is a schematic diagram expressing a trajectory of another vehicle.

In step S4, the distance calculation unit 76 and the speed detection unit 78 associate the information about the distance r from the reference line 104 to the other vehicle 92 and the information about the speed v of the other vehicle 92, with time information (for example, system time), and stores the associated information in the storage device 60. For example, the storage device 60 stores distances $r_0$ to $r_{-n}$, and speed $v_0$ to $v_{-n}$, in time series as illustrated in FIG. 5. Regarding the letters r and v shown here, the smaller subscript means the older information. After step S4, the process advances to step S5.

Figure 6:
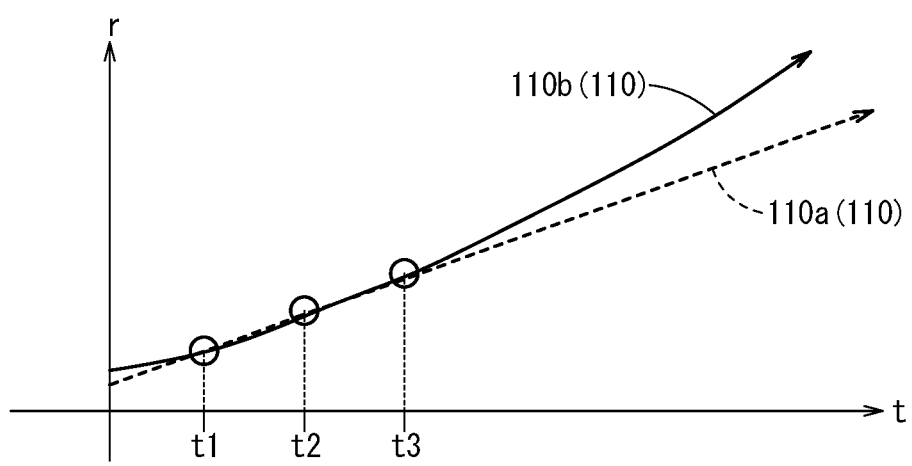
FIG. 6 is a diagram expressing distance approximate expressions.

In step S5, the prediction unit 80 extracts the information corresponding to a predetermined number of pieces of the latest information from the information about the distances $r_0$ to $r_{-n}$, in time series stored in the storage device 60. The prediction unit 80 performs regression analysis by the least squares method on the basis of the extracted information so as to acquire one or more distance approximate expressions 110 including time t and the distance r as variables. For example, the prediction unit 80 acquires at least one of a one-degree distance approximate expression 110a ($r=at+b$) and a two-degree distance approximate expression 110b ($r=at^2+bt+c$) as illustrated in FIG. 6. Alternatively, the prediction unit 80 may calculate plural approximate expressions whose degrees are different from each other and average the approximate expressions so as to acquire the distance approximate expression 110. For example, the prediction unit 80 may acquire an average value of the distances r obtained at each predetermined time by each of the certain degree approximate expressions and perform the regression analysis by the least squares method on the basis of the average values at the predetermined times so as to acquire one or more distance approximate expressions 110 including the time t and the distance r as the variables. After step S5, the process advances to step S6.

Figure 7:
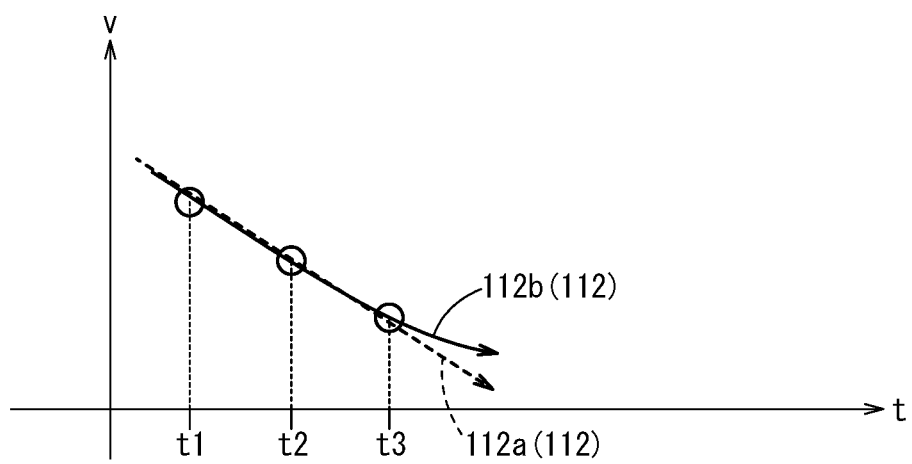
FIG. 7 is a diagram expressing speed approximate expressions.

In step S6, the prediction unit 80 extracts the information corresponding to the predetermined number of pieces of the latest information from the information about the speed $v_0$ to $v_{-n}$, in time series stored in the storage device 60. The prediction unit 80 performs the regression analysis by the least squares method on the basis of the extracted information so as to acquire one or more speed approximate expressions 112 including the time t and the speed v as the variables. For example, the prediction unit 80 acquires at least one of a one-degree speed approximate expression 112a (v=at+b) and a two-degree speed approximate expression 112b (v=at$^2$+bt+c) as illustrated in FIG. 7. Alternatively, the prediction unit 80 may calculate plural approximate expressions whose degrees are different from each other and average the approximate expressions so as to acquire the speed approximate expression 112. For example, the prediction unit 80 may acquire an average value of the speed v at each predetermined time by each of the certain degree approximate expressions and perform the regression analysis by the least squares method on the basis of the average values at the predetermined times so as to acquire one or more speed approximate expressions 112 including the time t and the speed v as the variables. After step S6, the process advances to step S7.

In step S7, the prediction unit 80 determines whether the other vehicle 92 tends to be displaced in one of the left and right directions of the travel lane 102a on the basis of the distance approximate expression 110. For example, if a slope of the one-degree distance approximate expression 110a (=a) is zero, the other vehicle 92 is traveling along the reference line 104. On the other hand, if the slope of the one-degree distance approximate expression 110a (=a) is not zero, the other vehicle 92 tends to be displaced in one of the left and right directions. Here, if the absolute value of the slope (=a) is more than or equal to a predetermined value, the prediction unit 80 determines that the other vehicle 92 tends to be displaced in one of the left and right directions. In addition, the determination condition may include the information about the latest distance $r_0$. For example, if the other vehicle 92 is deviated to the left side from the reference line 104 and tends to be displaced to the left side, that is, the distance $r_0$ is positive and the slope (=a) is more than or equal to the predetermined value, the prediction unit 80 may determine that the other vehicle 92 tends to be displaced in one direction. If the other vehicle 92 does not tend to be displaced (step S7: YES), the process advances to step S9. On the other hand, if the other vehicle 92 tends to be displaced (step S7: NO), the process advances to step S8.

In step S8, the prediction unit 80 performs a correction process for the distance approximate expression 110 to be described in [3.] below. After step S8, the process advances to step S9.

In step S9, the prediction unit 80 predicts the behavior of the other vehicle 92 by using the distance approximate expression 110 and the speed approximate expression 112. The prediction unit 80 calculates the position of the other vehicle 92 on the coordinate plane 94 at each predetermined time after the present time. In this case, the prediction unit 80 calculates a position R of the other vehicle 92 in the width direction on the basis of the distance approximate expression 110. In addition, the prediction unit 80 calculates a position S of the other vehicle 92 in the traveling direction on the basis of the time $t_n$ and the speed $v_n$ acquired from the speed approximate expression 112. Then, the prediction unit 80 plots the positions at each time after the present time on the coordinate plane 94 so as to predict the trajectory of the other vehicle 92. The action plan unit 66 sets a target travel trajectory and target speed of the host vehicle 90 by using the predicted trajectory.

Figure 8A:
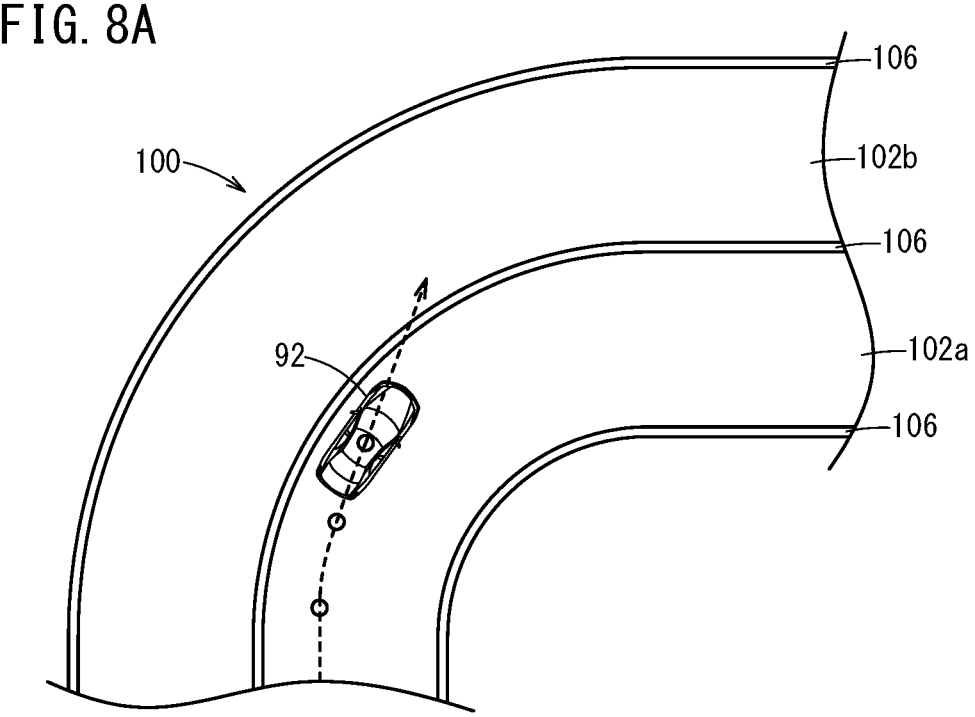
FIG. 8A is a diagram expressing the trajectory that is predicted by using only positional information.
Figure 8B:
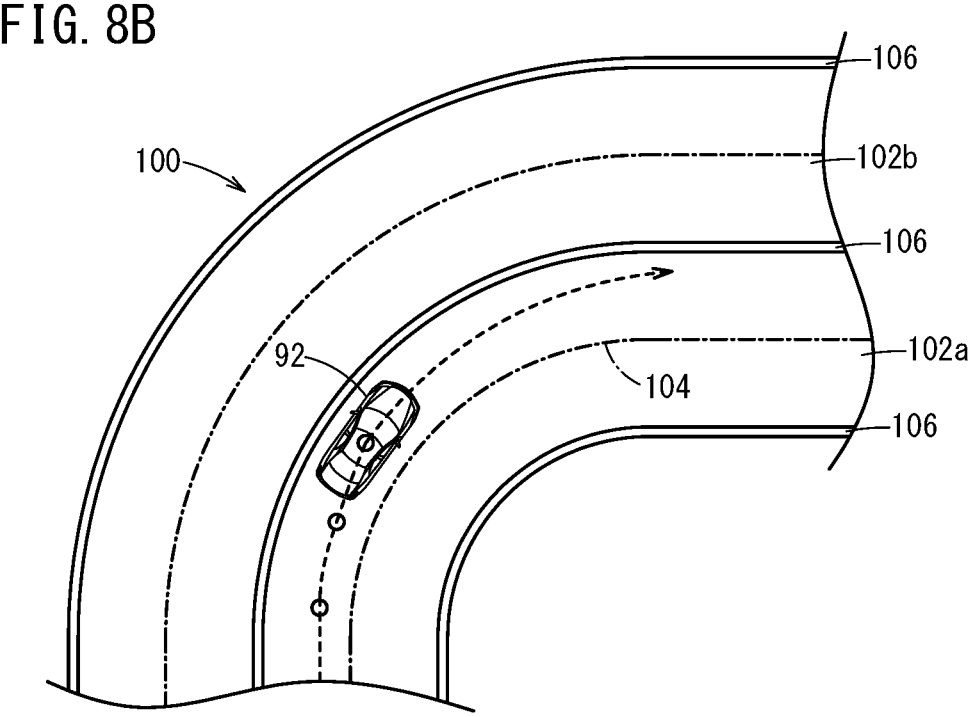
FIG. 8B is a diagram expressing the trajectory that is predicted by using information about a distance from a reference line to the other vehicle.

If the trajectory of the other vehicle 92 is predicted by only the past positional information of the other vehicle 92, the trajectory that is departed from the travel lane 102a may be predicted in the road 100 that is not straight as illustrated in FIG. 8A. On the other hand, as described in the present embodiment, when the trajectory of the other vehicle 92 is predicted by using the information about the distance r from the reference line 104 to the other vehicle 92, the trajectory can be predicted in accordance with the road shape even if the road 100 is not straight as illustrated in FIG. 8B. Note that in FIG. 8A and FIG. 8B, vehicles travel on the right side.

[3. Correction process for distance approximate expression 110]

In the behavior prediction process as illustrated in FIG. 4, the correction process for the distance approximate expression 110 performed in step S8 is described.

The prediction unit 80 determines whether the target exists in the direction where the other vehicle 92 is determined to be displaced in step S7. For example, if there is an opposite lane 102b (FIG. 8B, for example) or a three-dimensional object that is adjacent to the travel lane 102a in the displacement direction of the other vehicle 92, the prediction unit 80 corrects the distance approximate expression 110 so that a displacement amount of the other vehicle 92 is determined to be smaller. The prediction unit 80 determines whether the opposite lane 102b exists on the basis of at least one of the information from the external environment sensors 14 and the map information of the second map 52. Moreover, the prediction unit 80 determines whether the three-dimensional object exists on the basis of at least one of the information from the external environment sensors 14 and the map information of the second map 52.

If the opposite lane 102b or the three-dimensional object exists in the displacement direction of the other vehicle 92, the prediction unit 80 corrects the distance approximate expression 110 so that the displacement amount of the other vehicle 92 is determined to be smaller by decreasing the slope of the distance approximate expression 110 (=a). This correction is performed on the assumption that the other vehicle 92 is not departed from the travel lane 102a basically regardless of the trajectory in which the other vehicle 92 has traveled in the past.

Instead of performing the correction in which the slope of the distance approximate expression 110 (=a) is decreased, the prediction unit 80 may perform the following correction. For example, when the prediction unit 80 calculates the plural approximate expressions whose degrees are different from each other and averages the approximate expressions so as to acquire the distance approximate expression 110, the prediction unit 80 may acquire the weighted average. When the prediction unit 80 acquires the average values of the distances r at predetermined times by the plural certain degree approximate expressions, the prediction unit 80 increases the weight of the n-degree approximate expression that is the closest to the reference line 104. Then, the prediction unit 80 may perform the regression analysis by the least squares method on the basis of the average values at the predetermined times so as to acquire one or more distance approximate expressions 110 including the time t and the distance r as the variables.

Figure 9:
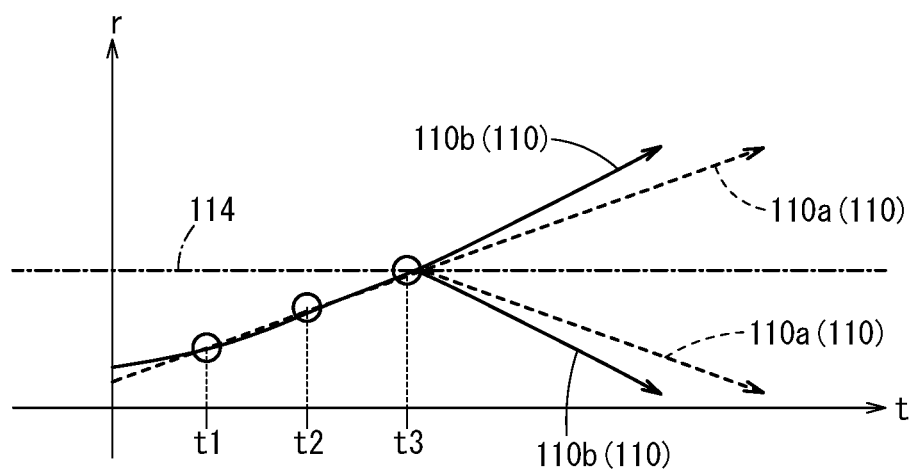
FIG. 9 is a diagram expressing the distance approximate expressions after correction.

Moreover, as illustrated in FIG. 9, on the coordinate plane of the distance approximate expression 110 (coordinate plane including time axis and distance axis), the prediction unit 80 may correct the distance approximate expression 110 by inverting the distance approximate expression 110 by using, as an axis, a straight line 114 that is parallel to the time axis.

[4. Modification]

In the above embodiment, the information about the reference line 104 is stored as the map information of the second map 52. However, the information about the reference line 104 may be stored as the map information of the first map 46, or stored as the map information in the storage device 60.

If the other vehicle 92 changes lanes, the trajectory in the lane change is different from that in the past. Thus, if the other vehicle recognition unit 72 detects blinker operation of the other vehicle 92, the prediction unit 80 may predict the trajectory of the other vehicle 92 that is not along the reference line 104. At this time, the prediction unit 80 does not use the distance approximate expression 110. Note that the other vehicle recognition unit 72 can detect the blinker operation of the other vehicle 92 on the basis of the information from the external environment sensors 14 or the communication unit 20.

[5. Technical concept obtained from embodiment]

The technical concept that is obtained from the above embodiment and the modification is hereinafter described.

An aspect of the present invention is the behavior prediction device 82 configured to predict the behavior of the other vehicle 92 traveling around the host vehicle 90, and the behavior prediction device 82 includes: the reference position setting unit 71 configured to set the reference position (reference line 104) along the shape of the road 100; the position detection unit 74 configured to detect the position of the other vehicle 92; the distance calculation unit 76 configured to calculate the distance r from the reference position (reference line 104) to the other vehicle 92 on the basis of the information about the reference position (reference line 104) and the information about the position of the other vehicle 92; and the prediction unit 80 configured to predict the trajectory of the other vehicle 92 on the basis of the information about the distances r in time series calculated by the distance calculation unit 76.

In the above configuration, the trajectory of the other vehicle 92 is predicted on the basis of the information about the distances r from the reference position (reference line 104) that is set along the road 100 to the other vehicle 92. Thus, the trajectory can be predicted more accurately than in the case where the trajectory of the other vehicle 92 is predicted by using only the positional information.

In the aspect of the present invention, the prediction unit 80 may be configured to perform the regression analysis by the least squares method with respect to the information about the distances r in time series calculated by the distance calculation unit 76, acquire the distance approximate expression 110 including the time t and the distance r as the variables, and predict the trajectory by using the distance approximate expression 110.

In the above configuration, since the regression analysis by the least squares method is performed, the trajectory can be predicted easily.

In the aspect of the present invention, the behavior prediction device 82 may further include the speed detection unit 78 configured to detect the speed v of the other vehicle 92, wherein the prediction unit 80 may be configured to predict the speed v of the other vehicle 92 on the basis of the information about the speeds v in time series detected by the speed detection unit 78.

In the above configuration, since the speed v is predicted, the position of the other vehicle 92 in the traveling direction can be predicted. Thus, the trajectory can be predicted further accurately.

In the aspect of the present invention, the prediction unit 80 may be configured to perform the regression analysis by the least squares method with respect to the information about the speeds v in time series detected by the speed detection unit 78, acquire the speed approximate expression 112 including the time t and the speed v as the variables, and predict the speed v by using the speed approximate expression 112.

In the above configuration, since the regression analysis by the least squares method is performed, the trajectory can be predicted easily.

In the aspect of the present invention, if the distance approximate expression 110 expresses the displacement of the other vehicle 92 to the one direction and if the opposite line 102b is present and is adjacent to the travel lane 102a of the other vehicle 92 in the one direction, the prediction unit 80 may be configured to correct the distance approximate expression 110 in a manner that the displacement amount of the other vehicle 92 to the one direction is determined to be smaller.

In the above configuration, the distance approximate expression 110 is corrected on the assumption that the other vehicle 92 is not departed from the travel lane 102a. Thus, the trajectory can be predicted further accurately.

In the aspect of the present invention, if the distance approximate expression 110 expresses the displacement of the other vehicle 92 to the one direction and if the three-dimensional object is present and is adjacent to the travel lane 102a of the other vehicle 92 in the one direction, the prediction unit 80 may be configured to correct the distance approximate expression 110 in a manner that the displacement amount of the other vehicle 92 to the one direction is determined to be smaller.

In the above configuration, the distance approximate expression 110 is corrected on the assumption that the other vehicle 92 is not departed from the travel lane 102a. Thus, the trajectory can be predicted further accurately.

In the aspect of the present invention, the prediction unit 80 may be configured to calculate the n-degree approximate expressions whose degrees are different from each other and average the n-degree approximate expressions whose degrees are different so as to acquire the distance approximate expression 110, and if the distance approximate expression 110 is corrected, the prediction unit 80 may be configured to increase the weight of the n-degree approximate expression that is close to the reference position (reference line 104) and acquire the weighted average of the n-degree approximate expressions whose degrees are different so as to correct the distance approximate expression 110.

In the aspect of the present invention, on the coordinate plane including the time axis and the distance axis, the prediction unit 80 may be configured to correct the distance approximate expression 110 by inverting the distance approximate expression 110 by using, as the axis, the straight line that is parallel to the time axis.

In the aspect of the present invention, if the blinker operation of the other vehicle 92 is detected, the prediction unit 80 may be configured to predict the trajectory of the other vehicle 92 that is not along the shape of the road 100.

Note that the behavior prediction device according to the present invention is not limited to the above embodiment, and can employ various configurations without departing from the gist of the present invention.

What is claimed is:

1. A behavior prediction device configured to predict behavior of another vehicle traveling around a host vehicle, the behavior prediction device comprising:
a reference position setting unit configured to set a reference position along a shape of a road;
a position detection unit configured to detect a position of the other vehicle;
a distance calculation unit configured to calculate a distance from the reference position to the other vehicle on a basis of information about the reference position and information about the position of the other vehicle; and
a prediction unit configured to predict a trajectory of the other vehicle on a basis of information about the distances in time series calculated by the distance calculation unit, wherein
the prediction unit is configured to perform regression analysis by least squares method with respect to the information about the distances in time series calculated by the distance calculation unit, acquire a distance approximate expression including time and the distance as variables, and predict the trajectory by using the distance approximate expression,
if the distance approximate expression expresses displacement of the other vehicle to one direction and if there is an opposite lane that is adjacent to a travel lane of the other vehicle in the one direction, the prediction unit is configured to correct the distance approximate expression by inverting the distance approximate expression by using, as an axis, a straight line that is parallel to a time axis on a coordinate plane including the time axis and a distance axis.

2. The behavior prediction device according to claim 1, further comprising a speed detection unit configured to detect a speed of the other vehicle, wherein the prediction unit is configured to predict the speed of the other vehicle on a basis of information about the speeds in time series detected by the speed detection unit.

3. The behavior prediction device according to claim 2, wherein the prediction unit is configured to perform regression analysis by least squares method with respect to the information about the speeds in time series detected by the speed detection unit, acquire a speed approximate expression including time and the speed as variables, and predict the speed by using the speed approximate expression.

4. The behavior prediction device according to claim 1, wherein if blinker operation of the other vehicle is detected, the prediction unit is configured to predict the trajectory of the other vehicle that is not along the shape of the road.

5. A behavior prediction device configured to predict behavior of another vehicle traveling around a host vehicle, the behavior prediction device comprising:
a reference position setting unit configured to set a reference position along a shape of a road;
a position detection unit configured to detect a position of the other vehicle;
a distance calculation unit configured to calculate a distance from the reference position to the other vehicle on a basis of information about the reference position and information about the position of the other vehicle; and
a prediction unit configured to predict a trajectory of the other vehicle on a basis of information about the distances in time series calculated by the distance calculation unit, wherein
the prediction unit is configured to perform regression analysis by least squares method with respect to the information about the distances in time series calculated by the distance calculation unit, acquire a distance approximate expression including time and the distance as variables, and predict the trajectory by using the distance approximate expression,
if the distance approximate expression expresses displacement of the other vehicle to one direction and if there is a three-dimensional object that is adjacent to a travel lane of the other vehicle in the one direction, the prediction unit is configured to correct the distance approximate expression by inverting the distance approximate expression by using, as an axis, a straight line that is parallel to a time axis on a coordinate plane including the time axis and a distance axis.

* * * * *